United States Patent
Fullmer

[15] 3,659,492
[45] May 2, 1972

[54] CASING OR SHELL FEEDER ATTACHMENT FOR LOADING MACHINES

[72] Inventor: Roger W. Fullmer, Rockford, Ill.

[73] Assignees: Glen L. Dunahoo, Lindenwood, Ill.; Nathan Adler, Southfield, Mich.; Roger Fullmer, Rockford, Ill. , part interest to each

[22] Filed: Feb. 9, 1970

[21] Appl. No.: 9,805

[52] U.S. Cl..........................................86/46, 86/25, 221/10, 221/169
[51] Int. Cl....................F42b 33/14, G07f 11/28, B23g 7/02
[58] Field of Search....................86/45, 46, 23, 25; 221/169, 221/161, 10, 11

[56] References Cited

UNITED STATES PATENTS

| | | |
|---|---|---|
| 2,371,126 | 3/1945 | Best et al. ...............................86/45 X |
| 1,739,996 | 12/1929 | White ................................221/169 X |
| 3,430,808 | 3/1969 | Mathews..................................221/10 |

*Primary Examiner*—Benjamin A. Borchelt
*Assistant Examiner*—J. J. Devitt
*Attorney*—Andrew F. Wintercorn

[57] ABSTRACT

An inclined stationary hopper of circular form has a large discharge opening in the bottom thereof at the high end through which bullet casings (or shotgun shells) are dropped one by one open end up from holes provided in circumferentially spaced relation in the marginal portion of a rotary plate disposed in parallel spaced relation to the hopper bottom. The casings or shells drop open end up into the holes in the plate from a supply piled on top of the rotary plate in the low end of the hopper and are carried around to the discharge opening to be dropped, the open end up disposition of the casings or shells in the holes being assured because their closed flanged ends are appreciably heavier. Stirring of the casings or shells in the pile by an upwardly projecting finger on the rotary plate helps to jostle and tumble the same so they drop more quickly into the holes in the rotary plate. A funnel, disposed under the hopper's discharge opening, guides the casings or shells open end up into a substantially vertical feeder tube that extends down to the loading machine. The electric motor that transmits drive to the rotary plate through suitable reduction gearing is controlled by a switch operated by a feeler finger that extends through a slot in one side of the feeder tube near its upper end and is spring pressed normally upwardly to closed circuit position but arranged to be held down in open circuit position but arranged to be held down in open circuit position by one or more casings or shells to stop the motor when a pileup occurs in the tube due to the casings or shells not being processed as fast as they are being dropped into the feeder tube.

4 Claims, 7 Drawing Figures

Patented May 2, 1972

INVENTOR:
ROGER W. FULLMER

ATTORNEY

Patented May 2, 1972
3,659,492
2 Sheets-Sheet 2
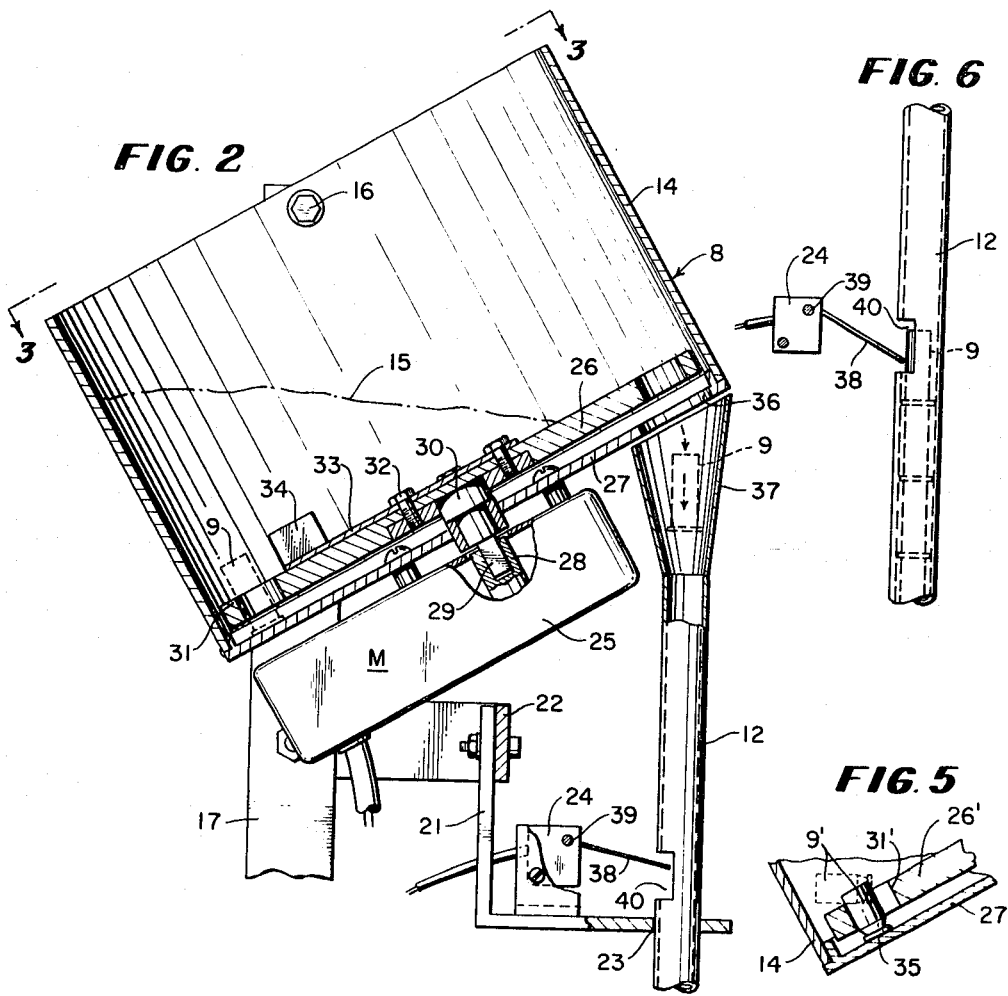
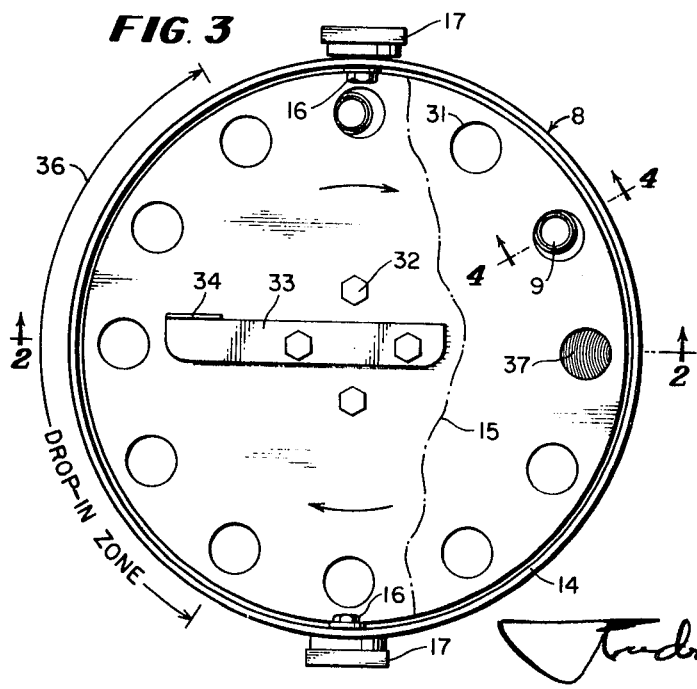
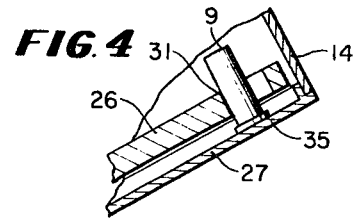
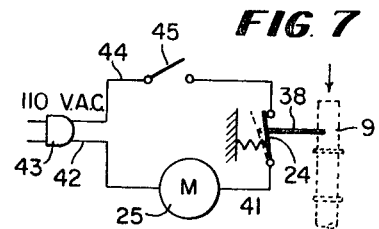
INVENTOR:
ROGER W. FULLMER
ATTORNEY

CASING OR SHELL FEEDER ATTACHMENT FOR LOADING MACHINES

This invention relates to a casing feeder attachment for bullet loading machines, the invention being also applicable to the feeding of shells to a shell loader.

There has long been a demand for an automatic casing feeder attachment for loading machines (and the same is true of shell feeding) as it means not only slow and tedious work filling a feed tube by hand with casings (or shells) but the loading machine usually stands idle all the time that this hand feeding must be done by the operator. The feeder attachment of my invention requires only maintaining a suitable supply of casings (or shells) in the hopper at the outset and the electric motor driven feeder mechanism attends to the delivering of a steady stream of casings (or shells) into the upper end of the feed tube, thereby allowing the operator to devote his full attention to the operation of the loading machine, which, even in the case of a hand-operated machine, has enough other things to occupy his complete attention, like the feeding of bullets (or shot) and the separate feeding of primers, without having to bother about filling another feed tube with the casings (or shells) at more frequent intervals.

The feeder attachment of my invention comprises an inclined stationary circular hopper with a funnel extending downwardly from an opening in the bottom thereof at the high side for discharge of casings (or shells) open end up into a feeder tube, and a rotary inclined perforated plate operated in a predetermined spaced parallel relationship to the bottom of the hopper, the perforations (which are preferably about one and one-half times the diameter of the casings or shells) being in a circular series around the marginal portion of the plate on a radius such that the casings (or shells) dropping into the holes and riding on their flanged lower end on the bottom of the hopper will fall through the funnel into the feeder tube, one by one, as the holes register with the funnel opening, the casings (or shells) being certain of dropping into the openings open end up by reason of:

1. The flanged closed end being appreciably heavier than the open end;
2. The continual agitation of the pile of casings (or shells) by a stirring projection on the top of the rotary plate causing the casings (or shells) to be tumbled around and dropped into the holes in the rotary plate more than they would otherwise as a result of the turning of the perforated plate alone, and
3. The weight of the pile of casings (or shells) above any given casing (or shell) that is teetering on the verge of entering an opening in the plate causing the casing (or shell) to drop into place flanged closed end down.

A novel spring pressed finger extending through a slot in one side of the feeder tube is normally urged upwardly to closed circuit position but is arranged to be held down by one or more casings (or shells) in the event of a pile-up of casings (or shells) in the feeder tube so as to turn off the electric motor automatically when there are more than enough stacked in the feeder tube.

It will be understood that wherever the word "casing" is used hereinafter, the word "shell" is also to be considered as interchangeable with it, to avoid the necessity of adding (or shell) in each instance.

The invention is described hereinafter by reference to the accompanying drawings, in which:

FIG. 2 is a vertical section through the hopper and the adjacent upper portions of the feeder attachment, taken on line 2—2 of FIG. 3;

FIG. 3 is a top view of the hopper on line 3—3 of FIG. 2;

FIG. 4 is a sectional detail on line 4—4 of FIG. 3 showing how the casings slide on the bottom of the hopper after dropping into the holes in the rotary plate;

FIG. 5 is a similar sectional detail in the plane of the line 2—2 showing (a) in dotted lines how the casings usually teeter on the edges of the holes before dropping in place therein open end up, and (b) a rotary plate with larger size holes to accommodate larger caliber casings;

Figure 1:
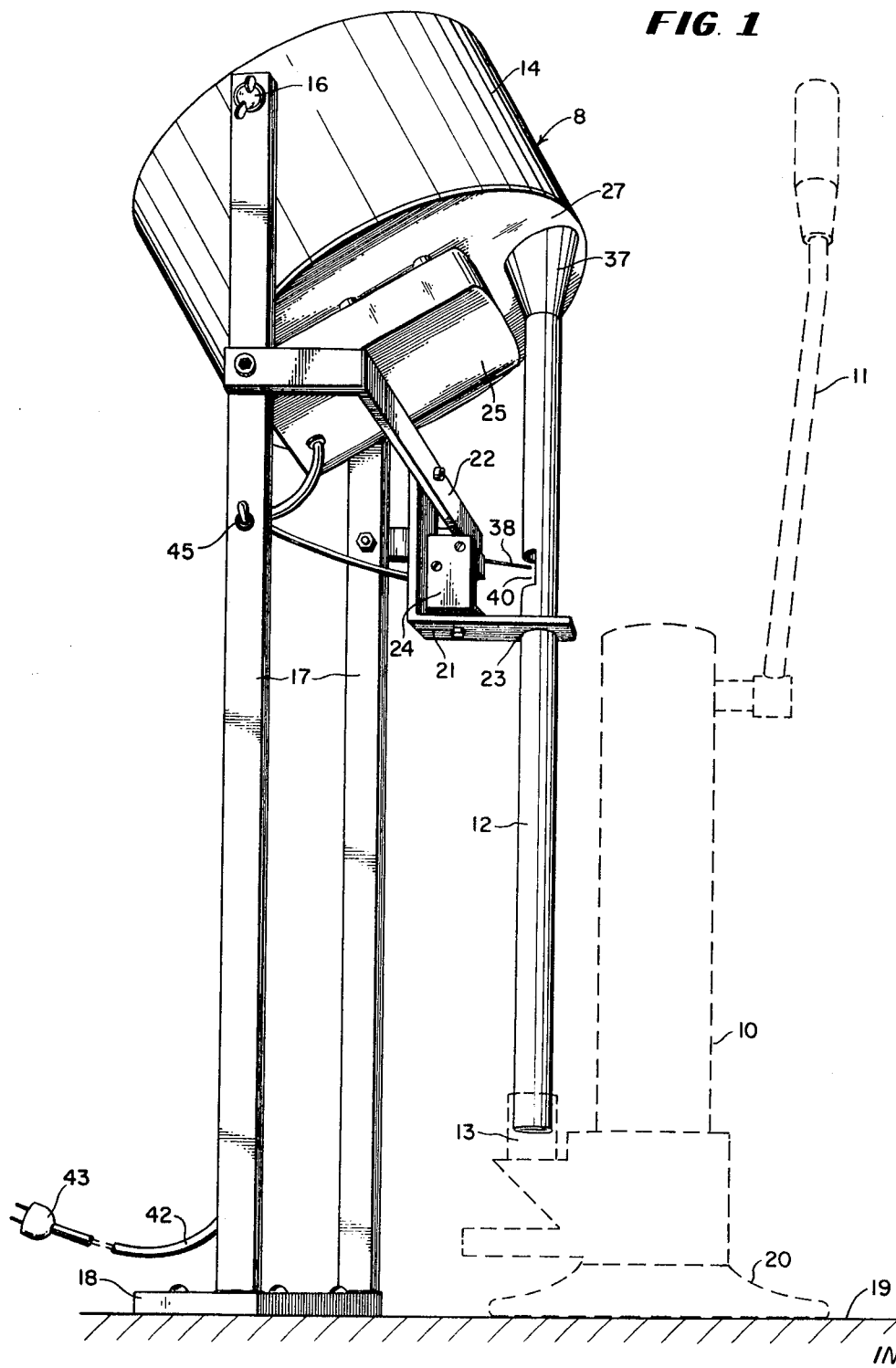
FIG. 1 is a side view of the casing feeder attachment with a hand-operated loading machine shown in dotted outline adjacent to it.

FIG. 6 is a detail of the feeder tube showing how the feeler finger operates the switch to stop the motor automatically when there is a pile-up of casings above a predetermined level due to the loader not using up the casings as fast as they are being dropped into the feeder tube from the rotary plate in the hopper, and FIG. 7 is an electrical wiring diagram showing the manually operated switch and the automatically operable switch both connected in series with the motor.

Similar reference numerals are applied to corresponding parts throughout the views.

Referring to the drawings, the reference numeral 8 designates the feeder attachment generally designed for feeding bullet casings 9 to a loading machine, the one indicated at 10 in FIG. 1 being a hand-operated one, as the handle 11 indicates, such as the well known Star loading machine manufactured in San Diego, California, believed to have been patented about 1940. In that machine, the casings fed downwardly open end up through the feeder tube 12 are transferred laterally at 13 into the loader on the first oscillation of handle 11 and indexed from one station to the next on each successive oscillation of the handle to have (1) the primer ejected; (2) a new primer fed from another tube and inserted; (3) a measured amount of powder supplied, and (4) a bullet fed from still another tube and inserted, a finished bullet being discharged into a container for each oscillation of the handle at the last station. If a casing 9 is accidentally fed from tube 12 open end down, it will not fit in the loader and the operator cannot oscillate handle 11 and the operator immediately corrects this by inverting the casing if it has not been damaged or inserting another one by hand. The feeder attachment 8 works so well that the chance of a casing being fed wrong end down to the loader is only one in about six hundred casings, judging from actual experience over many months of substantially daily use in commercial reloading on a fairly large scale. Filling the two tubes with primers and bullets is time consuming enough without the operator having to fill the third tube 12 with casings by hand and this tube will accommodate only a fraction of the number of units accommodated by either of the other two tubes, so, as a result, this necessitated much more frequent shutdowns of the loader and cut down the operating efficiency the most, and, accordingly, led to the development of the present automatic feeder attachment. With this attachment, the operator need only check the hopper 14 from time to time and see to it that casings are poured in to maintain the level indicated at 15 in FIGS. 2 and 3.

The hopper 14 is of cylindrical form and mounted, as shown at 16, on diametrically opposite sides in an inclined position between a pair of uprights 17 carried on a base 18 that rests on the same support 19 with the base 20 of the loader 10, the support 19 being usually a workbench or the like disposed at approximately table height from the floor. A bracket 21 suspended from a crosspiece 22 fixed to the uprights 17 provides support for the upper end portion of the feeder tube 12, as seen at 23, and also for a switch 24 that controls the electric motor 25 that drives a rotary plate 26 disposed in the bottom portion of the hopper 14 in spaced parallel relationship to the bottom 27 of the hopper. The motor drives the plate 26 through suitable reduction gearing, similarly as the spit of a barbecue apparatus, the end-most driven element being that indicated at 28 in FIG. 2 as having a square socket therein detachably engaged by the square shank 29 on the hub member 30 carrying the rotary plate 26. This permits substitution of one rotary plate for another, as, for example, whereas the plate 26 has circumferentially spaced holes 31 in the marginal portion thereof of a size approximately one and one-half times the diameter of a .38 bullet casing 9, another rotary plate 26' shown in FIG. 5 is of the same diameter as the plate 26 but has appreciably larger holes 31' provided therein to accommodate .45 bullet casings 9'. Either plate is adapted to be fastened to the hub 30 by screws 32, four of which are provided in 90° spaced relationship, two diametrically opposed screws serving to fasten a stirrer rod 33 having an upwardly projecting finger 34 on one end to agitate the casings and tumble them so that they will more quickly drop into the holes 31, flanged closed end 35 down and open end up, as seen in FIGS. 3 and 4. The dropin zone is indicated at 36 in FIG. 3. It is here that the casings are most apt to drop into the holes 31, as any casing teetering on the edge of a hole 31, like the casing 9' is shown in dotted lines as teetering on the edge of the hole 31' in FIG. 5, will drop into the hole with the closed flanged heavier end 35 down because of the appreciably greater weight of that end compared to the open end, and, of course, this dropping into place in this zone is due in good measure to the weight of the casings above any given casing teetering in this manner on the edge of one of the holes 31 or 31', the stirring of the casings by the finger 34 also helping in that direction. The casings, after entry in the holes 31 or 31', slide on their flanged ends 35 on the bottom 27 until they reach the large discharge opening 36 provided in the bottom 27 in the high end of the hopper, where the funnel 37 provided on the upper end of the feeder tube 12 under the opening 36 guides the casings into the feeder tube 12, as indicated in dotted lines in FIG. 2. As each casing drops down in the tube 12 it deflects a feeler finger 38 that is pivoted to the switch 24 and extends into the tube 12 through a slot 40 provided in one side wall thereof, but since the finger 38 is spring-pressed in an upward direction, as indicated diagrammatically at 41 in FIG. 7, the momentary interruption of the current to the motor 25 is not enough to stop the motor 25. It is only when the casings 9 have piled up in the feeder tube 12, as illustrated in FIG. 6, that the last one or two casings 9 on the stack hold the finger 38 down in open circuit position, stopping the motor 25 and accordingly stopping the delivery of casings to the feeder tube until the operator operating the loader 10 uses enough of the casings to release the finger 38 and thus allow the motor 25 to start again turning the plate 26.

In passing, 42 is a flexible extension cord which, as shown in FIGS. 1 and 7, terminates in a plug 43 that can be inserted in any convenient electrical outlet, the extension cord 42 having one wire connection, as at 44, with the on-off manual switch 45 that is connected in series with the other switch 24 that is automatically operable by finger 38 to stop the motor 25 when there is an excess number of casings 9 available in tube 12.

The operation should be clear from the foregoing description. The operator who oscillates the handle 11 of the loader 10 keeps the hopper 14 supplied with casings 9 or 9', depending upon which of the rotors 26 or 26', respectively, is being used, the usual height of the pile of casings being, as indicated roughly in dot-and-dash lines 15 in FIGS. 2 and 3, and, assuming he has closed the switch 45, motor 25 will turn the plate 26 or 26' at a predetermined reduced speed in relation to the motor speed causing the picking up of casings in holes 31 or 31' in the drop-in zone indicated at 36 in FIG. 3, the casings dropping into the holes heavy end down as shown in FIGS. 4 and 5, any casing teetering on the edge of one of the holes, as indicated in dotted lines in FIG. 5, being certain to drop down into the hole and rest on the bottom 27 of the hopper not alone because the flanged closed end 35 of each casing is the heavier end but also because of the weight of the pile of casings above it and the fact that these casings are continually being stirred by the finger 34 turning with the rotary plate 26 or 26'. The loader is, therefore, supplied with casings in a high enough ratio to the average speed of operation of the loader 10 so that there is always an adequate supply of casings in the lower end portion of the feeder tube 12 at any given time, the casings dropping into the tube past the finger 38 fast enough so that there is no danger of the motor 25 being stopped accidentally on that account. It is only when the operator's time is taken up replenishing the supply of casings at 15 in hopper 14 or when he is occupied in replenishing the supply of primers or bullets in the other two gravity feed tubes, that a pile-up of casings might occur in the feeder tube 12, in which event finger 38 is moved downwardly and held down, as shown in FIG. 6, in open circuit position against the action of its return spring 41, that the motor 25 is temporarily shut off. In view of the great increase in production made possible with the feeder attachment 8 and that it is available at a fraction of the cost of the loader 10, this attachment should pay for itself in a short time wherever loaders are used on a commercial scale. The casings 9 shown are for .38's and the shorter and larger diameter casings 9' are for .45's, and, as previously indicated, the invention is also applicable to the feeding of shells for shotguns although no shells have been shown.

It is believed the foregoing description conveys a good understanding of the objects and advantages of my invention. While a preferred embodiment of the invention has been illustrated and described, this is only for the purpose of illustration, and it is to be understood that various modifications in structure will occur to a person skilled in this art.

I claim:

1. In a casing or shell feeder attachment for a loading machine, the combination of a substantially cylindrical open top hopper supported in an inclined position and having a discharge opening provided in the bottom thereof at the high portion over a gravity feeder tube that is straight its full length and extends substantially vertically downwardly to and is connected at its lower end with the loader to supply empty bullet casings or shotgun shells open end up to the loader for loading one at a time, a rotatable substantially circular plate of nearly the same diameter as said hopper rotatably mounted therein in a predetermined vertically spaced relation to the bottom thereof and having circular holes provided therein in circumferentially spaced relation in the marginal portion thereof, all of a diameter larger than the diameter of the bullet casings or shotgun shells but smaller than their length so that the heavier flanged closed ends of said bullet casings or shotgun shells will drop freely therethrough to slide on the bottom of the hopper and the casings or shells will be dropped open end up into the tube in the feeding operation.

2. A structure as set forth in claim 1, wherein the plate is removable and replaceable in said hopper and there is at least a second rotatable circular plate of substantially the same diameter that may be substituted therefor also having circumferentially spaced holes of a different diameter than those in the first plate provided in the marginal portion thereof but similarly related in diameter and length of other bullet casings or shotgun shells whereby to enable using the same feeder attachment with the loading machine in the feeding of a different size of bullet casings or shotgun shells without other changes in said attachment.

3. A structure as set forth in claim 1, wherein the feeder tube has a side opening provided therein of small size in relation to the length of the bullet casings or shotgun shells through which a feeler finger connected with an auxiliary switch normally projects to open the switch when a predetermined stack of casings or shells is built up in said tube, there being an electric motor connected through reduction gearing with the rotary plate to turn it continuously at a predetermined speed when a manually operable switch connected in circuit with said auxiliary switch is closed to connect said motor with a source of electric current supply.

4. A structure as set forth in claim 3 including spring means normally holding said auxiliary switch in a closed position, said feeler finger being operable by a bullet casing of shotgun shell against the action of said spring means to open said auxiliary switch when sufficient casings or shells accumulate in said feeder tube.

* * * * *